US012630447B2

(12) United States Patent (10) Patent No.: US 12,630,447 B2
Segura (45) Date of Patent: May 19, 2026

(54) BUOYANT WATER PURIFICATION PAD

(71) Applicant: MAXIMIDEAS INC., Stoney Creek (CA)

(72) Inventor: Nestor Ivan Segura, Stoney Creek (CA)

(73) Assignee: MAXIMIDEAS INC., Stoney Creek (CA)

( * ) Notice: Subject to any disclaimer, the term of this patent is extended or adjusted under 35 U.S.C. 154(b) by 394 days.

(21) Appl. No.: 18/197,753

(22) Filed: May 16, 2023

(65) Prior Publication Data

US 2024/0383780 A1 Nov. 21, 2024

(51) Int. Cl.
| *C02F 1/40* | (2023.01) |
| *B01J 20/26* | (2006.01) |
| *B01J 20/28* | (2006.01) |
| *C02F 1/28* | (2023.01) |
| *D04H 1/4291* | (2012.01) |
(Continued)

(52) U.S. Cl.
CPC .............. *C02F 1/40* (2013.01); *B01J 20/261* (2013.01); *B01J 20/28011* (2013.01); *B01J 20/28035* (2013.01); *B01J 20/28042* (2013.01); *C02F 1/288* (2013.01); *D04H 1/4291* (2013.01); *D04H 1/56* (2013.01); *D04H 3/007* (2013.01); *D04H 3/14* (2013.01); *D04H 3/16* (2013.01); *E02B 15/045* (2013.01); *E02B 15/06* (2013.01); *C02F 1/285* (2013.01); *C02F 2101/32* (2013.01); *C02F 2103/007* (2013.01); *C02F 2103/08* (2013.01); *C02F 2103/42* (2013.01); *D10B 2321/022* (2013.01); *D10B 2401/021* (2013.01); *D10B 2505/00* (2013.01)

(58) Field of Classification Search
CPC ............... B01J 20/261; B01J 20/28011; B01J 20/28035; B01J 20/28042; C02F 1/285; C02F 1/288; C02F 1/40; C02F 1/681; C02F 2101/32; C02F 2103/007; C02F 2103/08; C02F 2103/42; D04H 1/4291; D04H 1/56; D04H 3/007; D04H 3/14; D04H 3/16; E02B 15/045; E02B 15/06; E02B 15/101
USPC ..................................................... 210/170.05
See application file for complete search history.

(56) References Cited

U.S. PATENT DOCUMENTS

| 3,904,528 A | * | 9/1975 | Yocum ................... B01D 17/10 210/924 |
| 5,165,821 A | * | 11/1992 | Fischer ............... E02B 15/0814 405/63 |
| 5,281,463 A | | 1/1994 | Cotton |

FOREIGN PATENT DOCUMENTS

| EP | 2165977 A1 | 3/2010 |
| EP | 2660392 A1 | 11/2013 |
(Continued)

OTHER PUBLICATIONS

Written Opinion of PCT/CA2024/000011, Oct. 23, 2023, Maximideas Inc.

*Primary Examiner* — Claire A Norris

(57) ABSTRACT

A contaminant sorptive buoyant pad is provided to preferentially absorb or adsorb contaminants from a water body surface. The pad includes a laminar core which is formed from side-by-side stacked layers of superabsorbent melt-blown polypropylene microfiber fabric, and which has a density less than water. The porosity and inter-layer spacing between adjacent stacked layers is selected to facilitate contaminate absorptive and the capillary movement and
(Continued)

wicking of hydrocarbons and other contaminants from the water surface into the pad interior.

17 Claims, 11 Drawing Sheets

(51) Int. Cl.

| | |
|---|---|
| *D04H 1/56* | (2006.01) |
| *D04H 3/007* | (2012.01) |
| *D04H 3/14* | (2012.01) |
| *D04H 3/16* | (2006.01) |
| *E02B 15/04* | (2006.01) |
| *E02B 15/06* | (2006.01) |
| *C02F 101/32* | (2006.01) |
| *C02F 103/00* | (2006.01) |
| *C02F 103/08* | (2006.01) |
| *C02F 103/42* | (2006.01) |

(56) References Cited

FOREIGN PATENT DOCUMENTS

| | | | |
|---|---|---|---|
| GB | 2069361 | A | 2/1980 |
| WO | WO 2018/046030 | A1 | 3/2018 |
| WO | WO 2024/234074 | A1 | 11/2024 |

* cited by examiner

BUOYANT WATER PURIFICATION PAD

SCOPE OF THE INVENTION

The present invention relates to a purification apparatus for removing contaminants from surfaces of water bodies, and more particularly to a buoyant floatation pad which is provided with a sorptive laminar core configured to absorb and/or adsorb contaminants such as hydrocarbons, fats and/or esters which are dispersed on the water surface.

BACKGROUND OF THE INVENTION

In the remediation of marine oil spills, it is known to deploy containment booms as a floating barrier to contain spilt oil and prevent the dispersion of hydrocarbons more broadly over the water surface. Typically, the containment boom is floated on the water body surface and forms a physical barrier against oil movement, allowing for its concentration and mechanical collection by oil skimmers, vacuum pumps and the like.

The use of conventional boom and mechanical collection techniques in spill remediation however, presents challenges in dealing with spills of both thinner light hydrocarbons, as well as those which extend over more open areas and/or on larger water body surfaces where wind and wave action may result in contaminants washing over and past the boom.

Consideration has been given to using buoyant, oil absorptive non-woven fiber mats as a means to absorb and preferentially trap the spilt hydrocarbons, so as to limit their further dispersal. The applicant has appreciated however, that in addition to difficulties with respect to the size of absorbent mats required and physical challenges in their deployment, once saturated, the added weight of the absorbed oil would make such mats extremely unwieldy, hindering both their removal after use, as well as the possible recycling of any oil products absorbed thereby.

SUMMARY OF THE INVENTION

It is an object of the present invention to provide a buoyant water purification or containment mat or pad which allows for the capture and/or removal of contaminants such as oils, fats and esters which are dispersed on a water body surface.

In one non-limiting embodiment, a buoyant mat or pad is provided which is configured to be floated on a water body surface to preferentially absorb and/or adsorb contaminants, and preferably hydrocarbons such as oils, diesel fuels, gasoline and the like, from a water body surface, allowing for the contaminant, capture and collection thereby. More preferably, the buoyant pad is provided with a generally flattened lateral shape which is adapted for positioning on the water body surface to assist in purifying the water body by the preferential sorption of contaminants into the pad interior. More preferably, the pad allows for release and recycling of collected contaminants, by physically pressing or rolling the pad following contaminant saturation.

In one envisioned use, the contaminant sorptive pad may be deployed alone or as part of a tethered array by floating on a water body surface, such as the ocean or a lake environment, as a means of mitigating or remediating chemical, oil or other fuel spills. In other applications, contaminant sorptive pads may be deployed on the surface of a swimming pool or hot tub to facilitate the collection and removal of contaminants such as oils, fatty acids and/or esters, such as those which emanate from user sunscreens and/or skin care products.

In another non-limiting embodiment, a number of buoyant floatation pads may be provided as modular components which are adapted to be tethered or fixedly secured relative to each other and floated on a water body surface to function as a physical containment boom which, in addition to providing for the absorption and/or adsorption of contaminant oils and/or other hydrocarbons, functions as a physical barrier to limit contaminant dispersion.

The sorptive pad preferably is adapted to assist in contaminant removal and water body purification. The pad includes one or more laminar cores which are formed from a number of stacked or laminar fabric or fabric-like layers. The laminar layers are selected and configured to preferentially absorb, and preferably also adsorb hydrocarbons, fats, esters and/or other contaminants. The laminar core layers are more preferably formed from a superabsorbent microfiber material such as polypropylene. Although not essential, the microfiber material is most preferably a non-woven fabric which is at least partially hydrophobic, and which has a density less than seawater or freshwater, depending on the intended pad usage.

Whilst not essential, in one embodiment, the laminar core is formed with a plurality of meltblown polypropylene sheet layers which are provided in a side-by-side lateral or horizontally stacked juxtaposed arrangement. More preferably the core layers are provided with a side-by-side stacked juxtaposed arrangement so that when the pad is deployed, the inter-layer spacing between adjacent layers is generally vertically elongated in a direction normal to the water surface, and with the spacing selected to facilitate wicking and capillary movement of hydrocarbons and other contaminants from a surface portion of the water body, towards and into the pad interior.

In one possible construction, the laminar core is formed as a stacked construct of generally aligned and parallel oriented fabric sheets. In another possible construction, the core is provided with one or more spiral-wound coil bodies formed by winding or coiling one or more elongated fabric or meltblown polypropylene sheets spirally about a central axis. The meltblown polypropylene sheets most preferably have a porosity structure selected to be at least partially hydrophobic, whilst allowing for the preferential absorption and adsorption of hydrocarbons or other contaminants within the core, to facilitate their collection and removal thereby.

In another embodiment, a contaminant sorptive body is provided as part of a 3" to 72" diameter pad and more preferably a disk-shaped pad. The pad preferably extends with a vertical thickness selected at between about 0.5 to 12", and preferably about 0.5 to 3", with parallel upper and lower surfaces. The sorptive buoyant body may incorporate one or more laminar cores. Optionally, the laminar cores may be mounted to or sandwiched between one or more rigid or semi-rigid fluid porous panels.

In another embodiment, the laminar core is formed having a plurality of generally vertically oriented, stacked or juxtaposed fabric layers or sheets. Preferably the juxtaposed sheet layers are formed by coiling a meltblown polypropylene sheet spirally about a central axis. More preferably, the coiled sheet layers are secured or fixed under a winding tension selected to provide the laminar core with a rigidity or semi-rigidity selected to maintain a side-by-side stacked sheet layer arrangement, and resist the lateral deformation or vertical deflection of the laminar core against wave action.

Optionally, porous covering sheet layers may be provided over and/or enveloping the upper and lower surfaces of the sorption body surfaces. In one possible construction, the covering sheets may be provided as fluid permeable spunbond polypropylene sheets. Optionally, the spunbond polypropylene sheets may be glued, or heat fused or welded to an associated coiled, meltblown polypropylene laminar core, to assist in maintaining the stacked or wound core layer orientation.

In another embodiment, the present invention provides an absorptive/adsorptive contaminant containment pad or mat which may be used to assist in the collection and/or possible recycling or reuse of contaminates which have been spilt on the ground or on the building floor surfaces. Preferably, the containment mat is adapted to collect and/or to limit or prevent the further spread of contaminant spills. It is envisioned that on the occurrence of a spill, the containment pad could be physically positioned over the spilt contaminants and contaminated area, and optionally, pressure may be applied thereto, as for example to facilitate absorption and the capillary wicking of contaminants into the laminar core layers.

Where buoyancy of the containment pad is less of a concern, as for example where the pad is to be used in the collection of contaminants on hard surfaces such as the ground or floor, the laminar core may be treated to increase hydrophilic properties of the laminar core layers, and increase the overall absorptive capacity of the pad.

In a further embodiment, the spirally wound laminar core layers may be treated to facilitate contaminant wicking. Suitable compounds for treating the coiled core fabric layers include without restriction the coating or impregnation of meltblown microfiber fabric with surfactants, as well as the use of additives in the form of pellets to be added to the polypropylene resin in the plastic extruder to produce a meltblown non-woven fabric which is hydrophilic so it can better absorb water and other sort of chemicals.

In another non-limiting embodiment, the meltblown polypropylene sheet used to form laminar core layers is impregnated with a suitable wetting agent such as VW451™ sold by Polyvel Inc. or NuWet 550™ sold by Momentive Performance Materials Inc. In other possible configurations, wetting agents may be applied selectively to either the bottom and/or top surfaces of the laminar core and/or its cover layers to facilitate preferential absorption and wicking of fluids into bottom and/or top surfaces of the absorptive body.

In another embodiment, the absorptive pad may be provided as an oil absorptive drum topper for positioning on 55 gallon drums which are stacked or unstacked to collect spills.

In other embodiments, the water purification pad is provided as a buoyant pad for use on swimming pools or hot tubs to assist in the removal of oily substances such as fats or esters originating from cosmetic products, sunscreens and the like.

The present invention may reside in various non-limiting aspects, and which for example may include without restriction:

1. An apparatus for the absorption and/or adsorption of contaminates, the apparatus comprising: at least one generally tabular sorption body configured for positioning in contact with said contaminates, the sorption body having generally parallel upper and lower surfaces and having a laminar core comprising a plurality of polypropylene sheet layers provided in a side-by-side juxtaposed arrangement, the polypropylene sheet layers having a porosity structure selected to provide at least partial sorption of said contaminates thereby and defining a spacing therebetween selected to effect the capillary rise of said contaminates towards an interior of the laminar core therein.

2. An apparatus for absorption and/or adsorption of contaminates from a surface of a water body, the apparatus comprising: a buoyant sorption body configured for floatation on the water body, the sorption body including a laminar core comprising a spiral wound superabsorbent microfiber polypropylene sheet coiled about a generally vertical axis and defining a plurality of generally vertically oriented non-woven polypropylene sheet layers provided in a substantially side-by-side juxtaposed arrangement, the polypropylene sheet layers having a porosity structure selected to provide at least partial absorption of said contaminates thereby, and defining a lateral spacing therebetween selected to facilitate capillary movement of the core said contaminates from said water body towards an interior of the laminar core.

3. A contaminant removal apparatus for use in absorbing contaminants from a water body surface, the waterbody surface being selected from the group consisting of an ocean body, a lake body, a swimming pool, and a hot tub, the apparatus comprising: a sorption body comprising a substantially hydrophobic coiled microfiber material strip, said strip being wound about a generally vertical axis, said body having spaced generally planar top and bottom portions, and a generally circumferential side portion connecting the top end portion and the bottom end portion, a top sheet of microfiber material overlaying the top portion, a bottom sheet of microfiber material overlaying the bottom end portion, wherein an edge portion of the top sheet and bottom sheet are welded together to at least partially envelope the sorption body, and at least one associated rib heat welded into at least one of the top sheet and the bottom sheet, each rib at least partially melt fusing the sheet and adjacent portions of the microfiber material strip.

4. An absorption apparatus for removing oil from a water body surface, the apparatus comprising: a buoyant laminar body configured to absorb and/or adsorb said oil, said laminar body comprising a coiled meltblown non-woven polypropylene sheet which is wound about a generally vertical axis and providing a plurality vertically oriented sheet layers arranged in a coiled side-by-side juxtaposed arrangement, wherein the coiled sheet is held under a winding wherein the tension force created from winding the polypropylene sheet, first and second polypropylene cover sheets substantially enveloping said laminar body, and wherein a perimeter of the first cover sheet and a perimeter of the second cover sheet are joined together, the first cover sheet being partially melt fused to said laminar body by at least one heat weld formed in said first cover and melt fusing said first cover an adjacent surface portions of said laminar body.

The apparatus according to any of the preceding or hereafter described aspects, wherein the apparatus is at least partially buoyant and is adopted for the removal of said contaminates from a water body surface, the apparatus further comprising: a first fluid porous cover member positioned over the upper sorption body surface, a second fluid porous cover member being positioned over the lower sorption surfaces, wherein each of the first and second porous cover members, comprise polypropylene.

The apparatus according to any of the preceding or hereafter described aspects, further comprising at least one respective heat weld thermally fusing a portion of each of the first and second cover members respectively to a respective upper and lower surface.

The apparatus according to any of the preceding or hereafter described aspects, wherein said laminar core comprises a non-woven microfiber sheet which is spirally wound radially about a generally vertical axis, and/or wherein said polypropylene sheet layers comprise spirally adjacent polypropylene sheet layers which are secured under a winding tension, and/or whereby said laminar core has a rigidity selected to resist deformation when said apparatus is positioned on said water body surface.

The apparatus according to any of the preceding or hereafter described aspects, wherein said sorption body has a specific gravity of less than about 1.

The apparatus according to any of the preceding or hereafter described aspects, wherein the laminar core comprises a spirally wound non-woven meltblown polypropylene sheet strip, and/or said sheet strip being substantially hydrophobic, and/or wherein said first and second cover members comprise substantially hydrophobic spunbond polypropylene fabric layers.

The apparatus according to any of the preceding or hereafter described aspects, wherein the polypropylene sheet layers are provided in a generally vertically oriented, laterally stacked side-by-side orientation as part of a substantially continuous, spiral wound meltblown polypropylene sheet winding, and/or said polypropylene sheet winding comprising a 20 to 100 gsm meltblown non-woven fabric.

The apparatus according to any of the preceding or hereafter described aspects, wherein said sorption body comprises a generally disk-shaped pad having generally planar parallel spaced upper and lower surfaces and/or a radial diameter selected at between about 3 and 72 inches, preferably between about 6 and 36 inches and more preferably between about 8 and 26 inches, and/or a vertical thickness selected at between about 0.5 and 8 inches, preferably between about 1 and 6 inches and most preferably between about 1.5 and 6 inches.

The apparatus according to any of the preceding or hereafter described aspects, wherein the sorption body includes at least one through-bore extending generally vertically through an axial center of said winding, the sorption body optionally including a reinforcing plug positioned at said axial center and defining said through-bore, and/or wherein the reinforcing plug comprises polypropylene or polyethylene.

An oil containment boom for the collection and/or containment of contaminant oil, wherein said containment boom comprises a plurality of the apparatus according to any of the preceding or hereafter described aspects tethered together in a generally edge-to-edge orientation.

The apparatus according to any of the preceding or hereafter described aspects, wherein said microfiber polypropylene sheet comprises a 10 to 150 gsm, preferably 20 to 100 gsm, and most preferably a 40 to 80 gsm, non-woven fabric having a density less than about 1 gm/cm³, and/or said microfiber polypropylene sheet being secured under a coiled tension selected to substantially maintain said laminar core with lateral integrity selected to substantially withstand wind or wave action when said sorption body is floated on said water body.

The apparatus according to any of the preceding or hereafter described aspects, wherein said laminar core is a generally disk-shaped core having a vertical thickness of between about 0.5 and 8 inches, preferably about 1 and 4 inches, and/or radial diameter selected at between about 3 and 72 inches, and more preferably about 12 to 36 inches.

The apparatus according to any of the preceding or hereafter described aspects, further including at least one fixing member, physically securing at least some of said polypropylene sheet layers in a tension coiled position in said substantially side-by-side juxtaposed arrangement.

The apparatus according to any of the preceding or hereafter described aspects, wherein said fixing member comprises a thermal weld physically melt fusing said at least some laterally adjacent ones of said polypropylene sheet layers.

The apparatus according to any of the preceding or hereafter described aspects, comprising a plurality, preferably at least four, and most preferably at least eight of said fixing members, and/or wherein each said fixing member comprising an elongate thermal weld extending radially relative to said vertical axis and physically melt fusing said at least some laterally adjacent said polypropylene sheet layers.

The apparatus according to any of the preceding or hereafter described aspects, wherein said laminar core is interposed between, and preferably substantially enveloped by, a top cover member and a bottom cover member, each of the cover members having a fluid porosity selected to permit the substantially unhindered movement of water and contaminants therethrough.

The apparatus according to any of the preceding or hereafter described aspects, wherein at least one, and preferably both of the cover members comprise spunbond polypropylene fabric sheets of 25 to 60 gsm, and preferably sheets of 30 to 50 gsm.

The apparatus according to any of the preceding or hereafter described aspects, wherein each spunbond polypropylene sheet is at least partially melt fused to at least some of said polypropylene sheet layers by at least one said fixing member.

The apparatus according to any of the preceding or hereafter described aspects, wherein the non-woven polypropylene sheet layers and/or the top cover member and/or bottom cover member, are chemically impregnated sheet layers which are impregnated with a wetting agent to increase hydrophilic properties.

The apparatus according to any of the preceding or hereafter described aspects, wherein the microfiber material strip comprises a 20 to 100 gsm meltblown non-woven polypropylene strip, said strip being wound about said vertical axis and defining a plurality of vertically oriented juxtaposed sheet layers, stacked laterally as a side-by-side array, and/or wherein the polypropylene sheet being secured under a coiled tension selected to assist in maintaining at least partial lateral integrity of said sorption body when positioned on said water body surface.

The apparatus according to any of the preceding or hereafter described aspects, wherein the sorption body includes an axially oriented through-bore, said apparatus further comprising a tether assembly received at least partially in the through-bore to facilitate positioning and/or retrieval of the apparatus from the water body surface, the tether assembly comprising a polypropylene cable.

The apparatus according to any of the preceding or hereafter described aspects, wherein at least one of the top sheet and the bottom sheet comprises a fluid permeable, spunbond polypropylene sheet, and preferably a 25 to 50 gsm hydrophobic polypropylene sheet.

The apparatus according to any of the preceding or hereafter described aspects, comprising a plurality of pairs of said heat welds, said heat weld pairs being opposedly formed in portions of said respective first and second cover sheets, and/or wherein the welds being generally elongated in an orientation extending radially from said vertical axis.

The apparatus according to any of the preceding or hereafter described aspects, wherein each of the first and second polypropylene sheets comprise a 25 to 60 gsm spunbond polypropylene fabric sheet.

A method of manufacturing an apparatus and preferably a water purification apparatus according to any of the preceding or hereafter described aspects, comprising: cutting a sheet of non-woven meltblown polypropylene material to strips, forming a roll body by coiling a selected said strip about a rotatable mandrel, under a winding tension whereby the roll body is formed having generally planar upper and lower surfaces, with said roll body removed from said mandrel joining a first layer and a second layer of polypropylene material by heat welding with the roll body interposed the first layer and the second layer, attaching a connecting member to the purification apparatus wherein the connecting member can be used to connect a further purification apparatus.

The method according to any preceding aspects, wherein said step of heat welding comprises forming a plurality of elongated melt welds radially in said roll body and wherein at least one melt weld partially melt fuses a portion of the first cover layer, and an adjacent portion of the roll body.

BRIEF DESCRIPTION OF THE DRAWINGS

Reference may be had to the following detailed description together with the accompanying drawings in which.

DETAILED DESCRIPTION OF THE PREFERRED EMBODIMENTS

Figure 1:
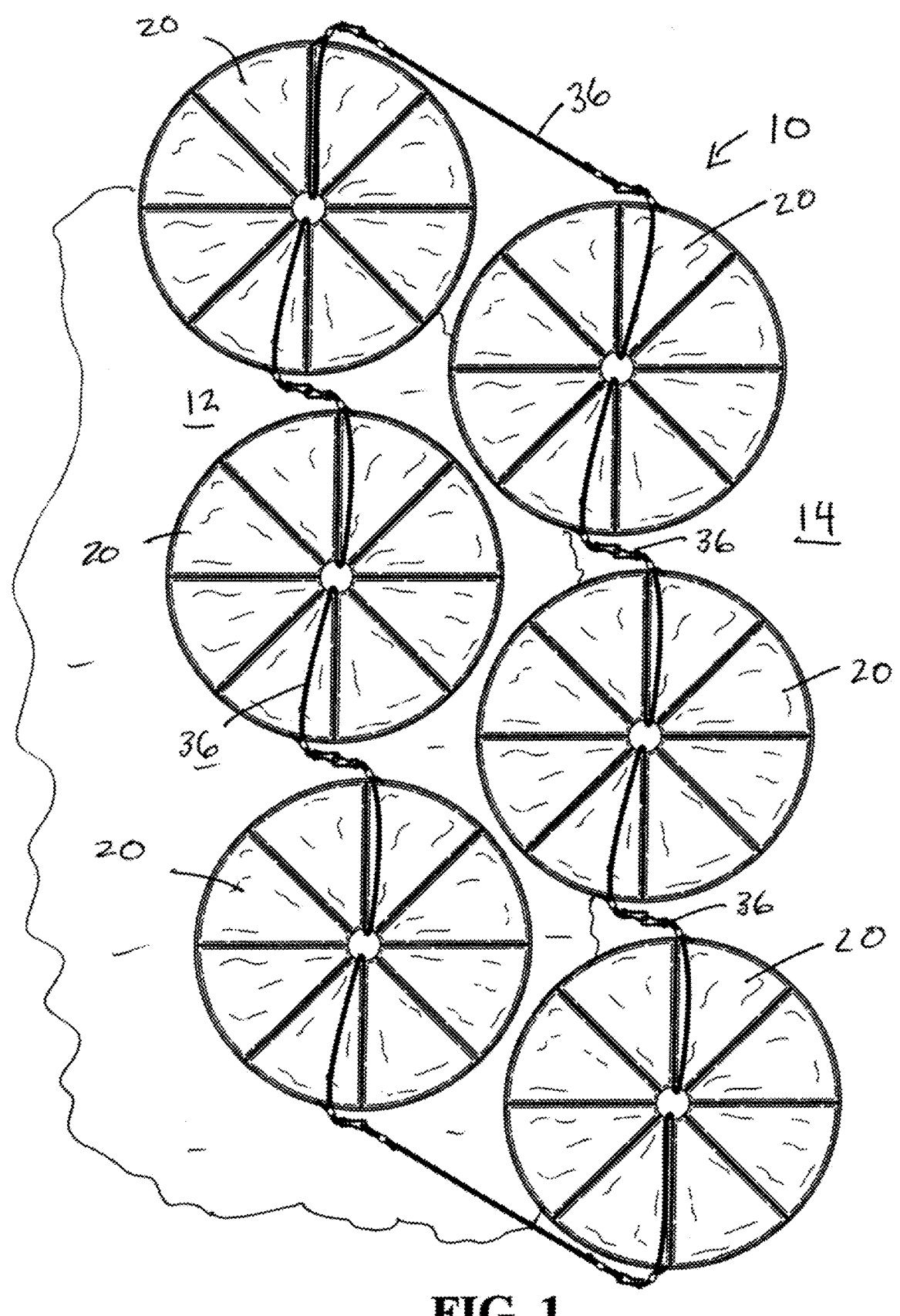
FIG. 1 illustrates an oil containment boom which is formed from a number of modular water purifying, contaminant sorptive flotation pads in accordance with a preferred embodiment of the invention.

Reference may now be had to FIG. 1 which illustrates an oil spill containment boom 10 which as will be described, is used in preventing the spread and dispersal of contaminate oil 12 across the water surface 14, of the water body 8 in accordance with a preferred embodiment of the invention. The containment boom 10 is shown as being comprised of a number of buoyant water purification flotation pads 20. Each of the pads 20 are of a modular construction and are adapted to be tethered to each other to form the boom 10 with the desired width, and elongated length. Any number of flotation pads 20 may be provided to form the containment boom 10 as a physical barrier which prevents or restricts the dispersal of the oil 12 over the water surface 14 therepast. Most preferably, the selected number of flotation pads 20 are interconnected so as form the containment boom 10, with overall width and length of the boom 10 chosen depending on the extent of the spilt contaminate oil 12 to be collected, and the nature of the particular water body 8.

As will be described, in addition to forming a physical barrier, the individual flotation pads 20 are configured to further selectively absorb and preferably also adsorb the oil 12 from the water surface 14 of the water body 8, allowing for collection and removal of the spilt oil 12 from the water body 8 therewith.

Figure 2:
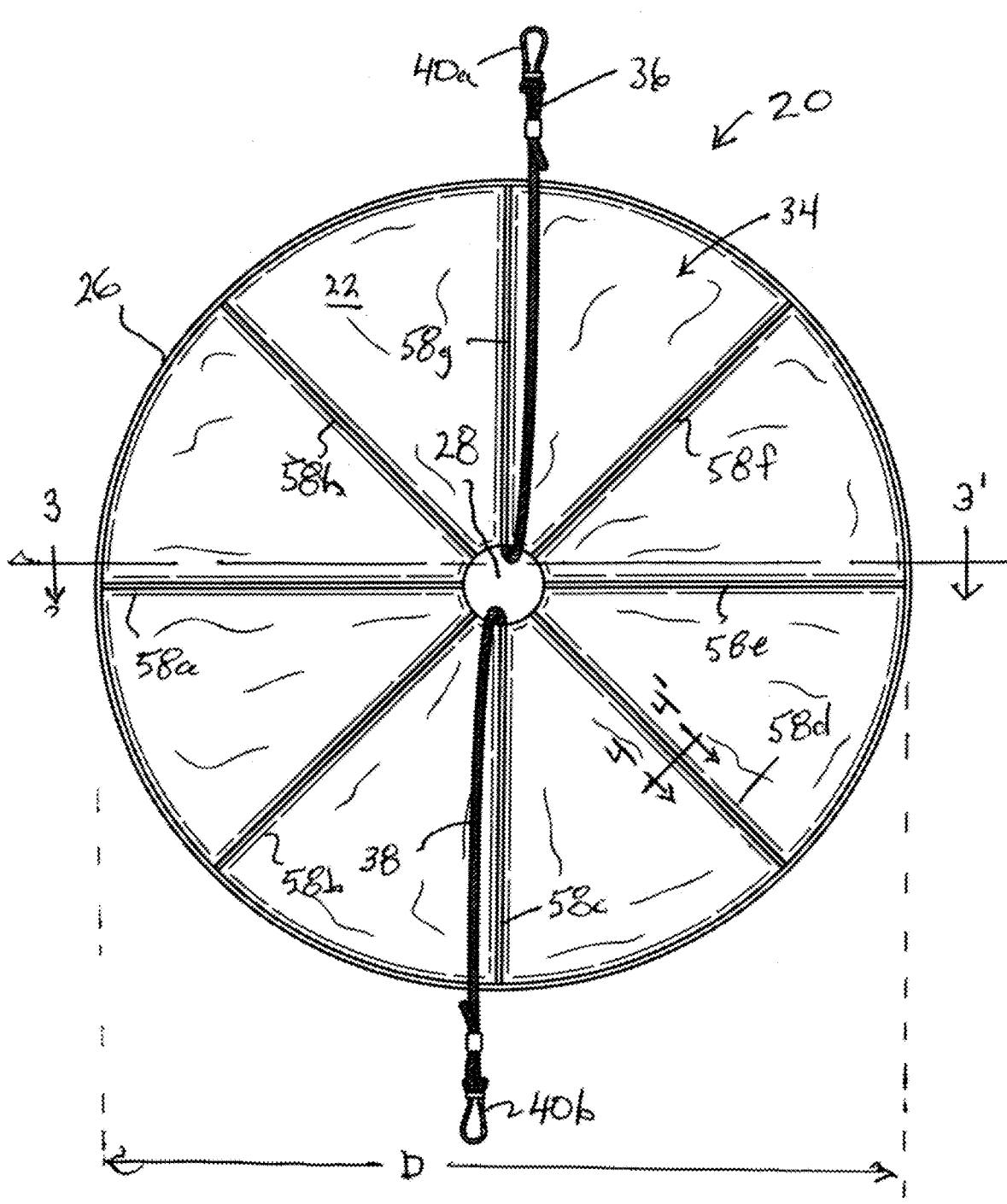
FIG. 2 shows a top perspective view of a sorptive flotation pad used in the oil containment boom of FIG. 1.
Figure 3:
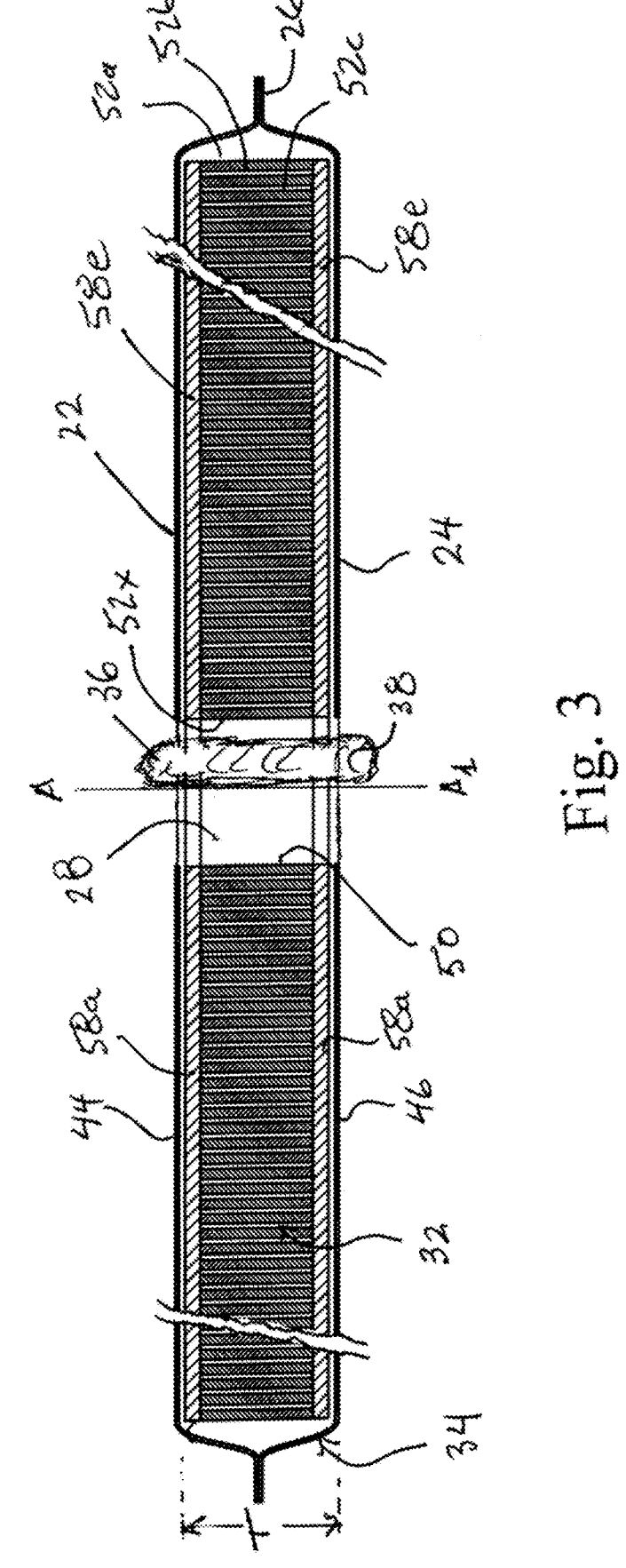
FIG. 3 illustrates a cross-sectional view of the flotation pad shown in FIG. 2 taken along line 3-31.
Figure 4:
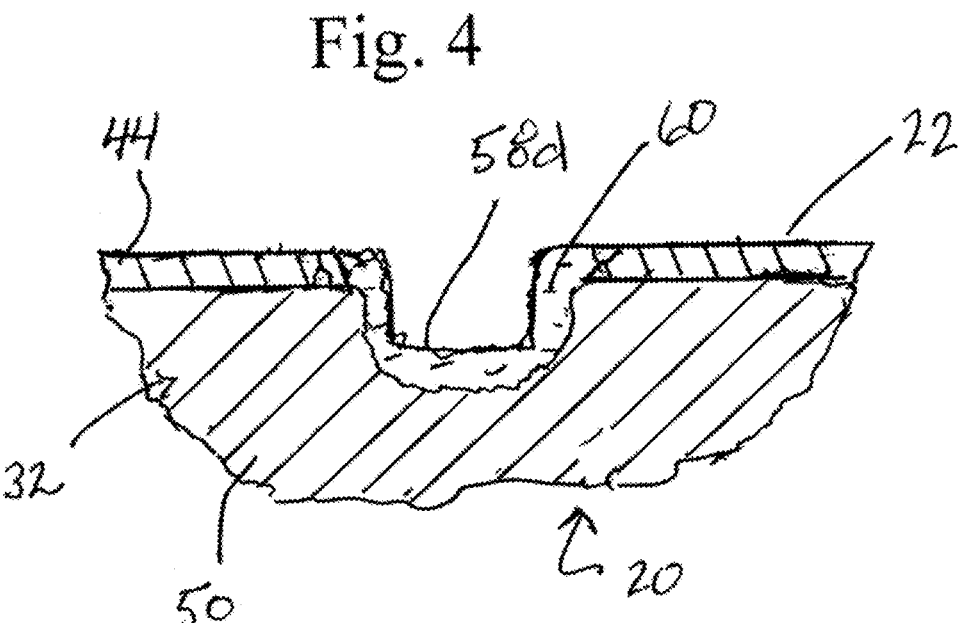
FIG. 4 illustrates an enlarged partial cross-sectional view of the flotation pad shown in FIG. 2 taken along line 4-41.

FIGS. 2 to 4 illustrate best the overall configuration of each floatation pad 20. The flotation pad 20 preferably has a generally flattened disk-shaped construction, with generally planar, parallel upper and lower surfaces 22,24, and a peripheral outer edge 26 which extends radially about an axially aligned through bore 28. To allow for simplified storage, transport and/or retrieval following use, the flotation pad 20 preferably is formed with a lateral radial diameter D of between 6 and 36 inches, preferably about 24 to 36 inches, and extends with a thickness T in the vertical direction of axis $A-A_1$ of between about 0.5 and 6 inches, and most preferably 1 to 3 inches. It is to be appreciated that flotation pads 20 having smaller or greater diameters and/or thicknesses may also be used, depending upon the specific nature of any contaminates to be collected thereby, and/or the particular characteristics of the water body 8 in which the pad 20 is to be deployed.

FIGS. 2 and 3 show best each pad 20 as including an inner laminar core 32, an outer cover 34 used to cover the laminar core 32 as a sleeve, and a tether assembly 36 used to interconnect the pad 20 to one or more adjacent pads 20 in the assembly of the containment boom 10.

The tether assembly 36 includes a polypropylene cable or rope 38 to which are secured mechanical carabiners clips, D-rings or other suitable fasteners 40a,40b. The fasteners 40a,40b may be used to releasably interconnect with the fasteners 40a,40b and/or polypropylene rope 38 of adjacent flotation pads 20 in the assembly of the containment boom 10, and/or anchor the pad 20 to a wharf, tow line or other suitable anchor structure. In one possible construction, the mechanical fasteners 40a,40b may be made from corrosive resistant metals such as stainless steel. Alternatively, to facilitate recycling of the flotation pad 20 the fasteners 40a,40b could be formed from moulded plastics such as polypropylene.

FIG. 2 illustrates a simplified manner of securing the tether assembly 36 to a remainder of the flotation pad 20, whereby the polypropylene rope 38 is looped through the through bore 28 and optionally knotted. It is to be appreciated that in alternative arrangements, the rope 38 could be mechanically secured to an upper or lower pad surface 22,24, as for example by the use of stitching or thermal welding. In addition, allowing for the interconnection of individual flotation pads 20, or anchoring the tether rope 38, may assist in both the initial deployment and retrieval of the pad 20 following contaminant saturation.

Figure 5:
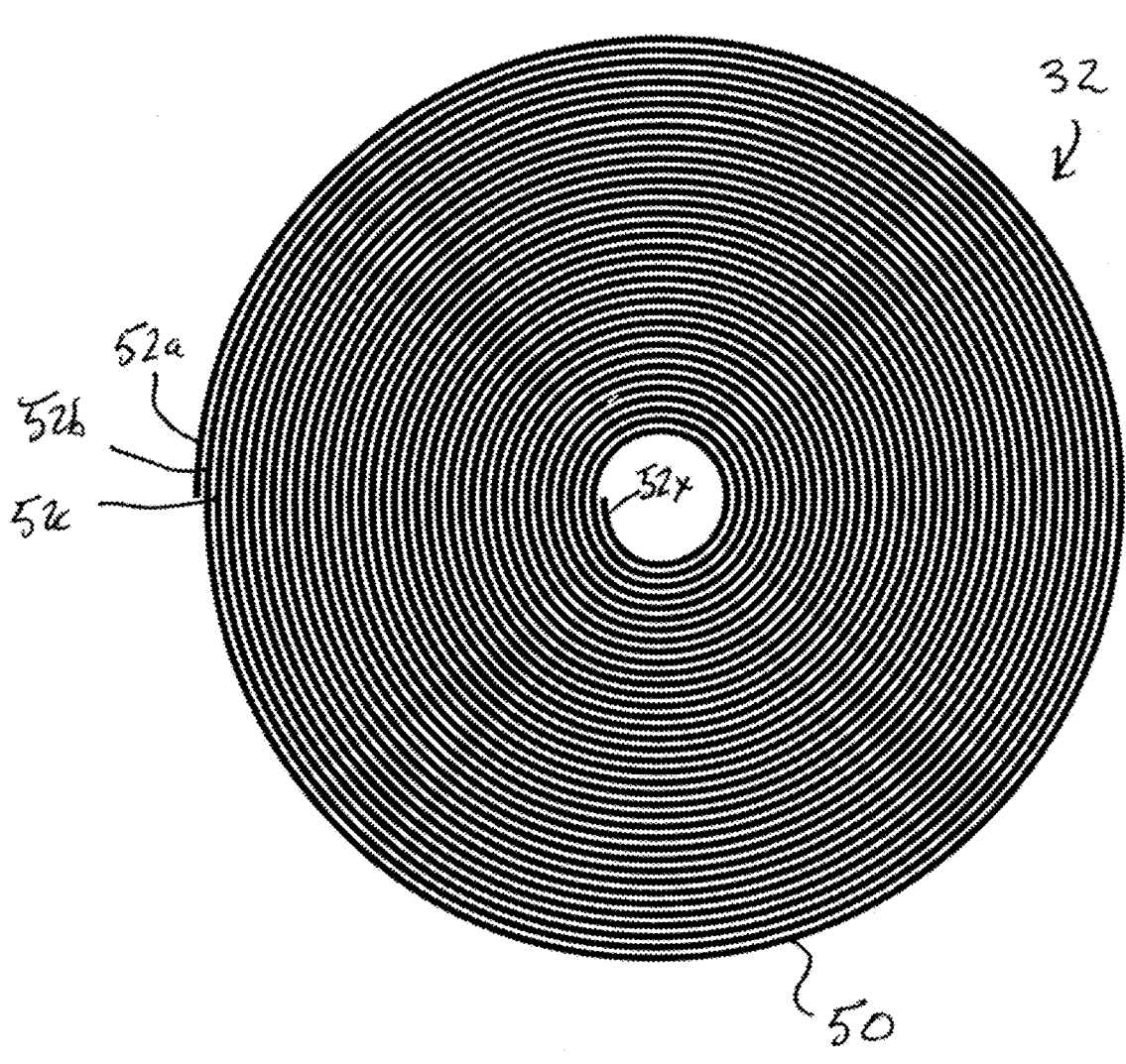
FIG. 5 illustrates a top perspective view of the spirally wound laminar core used in the flotation pad shown in FIG. 2.

FIGS. 3 and 5 illustrate best the laminar core 32 as being formed from an elongated coiled polypropylene sheet strip 50 which extends spirally about the central axis $A_1$-$A_1$ of the through bore 28. The sheet 50 is coiled about the axis $A_1$-$A_1$ such that when the pad 20 is floated in the water surface 14, the adjacent overlapping coiled core layers 52a,52b,52c . . . 52x are oriented in a side-by-side horizontally stacked, juxtaposed arrangement. Preferably, the polypropylene sheet strip 50 is selected from superabsorbent microfiber polypropylene material which is at least partially hydrophobic, and which has an internal porous structure 54 selected to absorb, adsorb and trap preferentially contaminant oil 12. Although not essential, more preferably the sheet strip 50 is selected from a 20 to 100 gsm non-woven fabric having a density less than 1 g/cm³, so as to provide the laminar core 32 with buoyancy on water.

Figure 6:
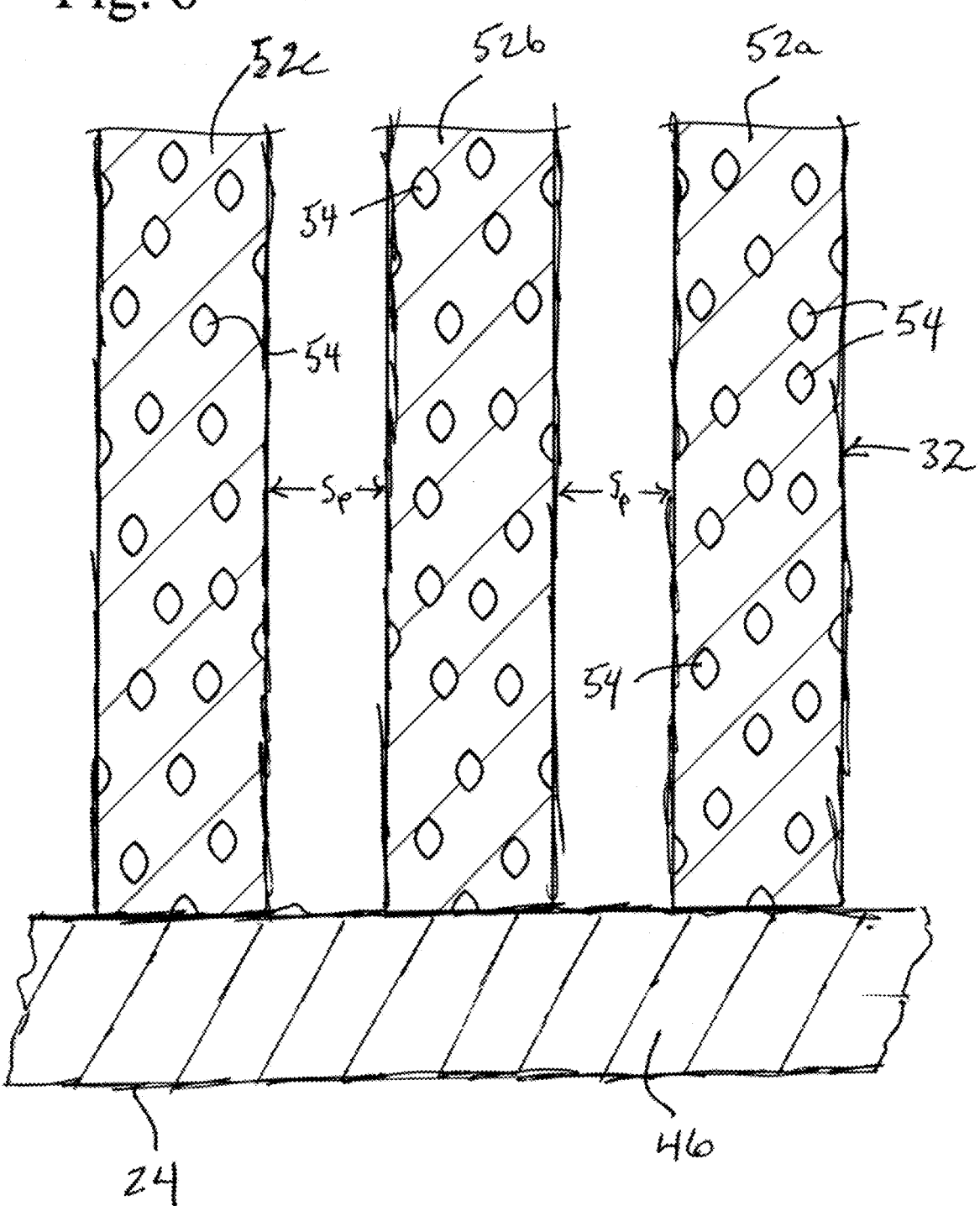
FIG. 6 illustrates an enlarged, partial sectional view of the laminar core fabric layers and bottom sheet of the flotation pad shown in FIG. 2.

As shown in FIG. 6, the sheet strip 50 is most preferably wound with a radial winding tension selected whereby the spacing Sp between the adjacent juxtaposed sheet layers 52a,52b,52c . . . 52x is selected to facilitate the capillary action and wicking of dispersed contaminant oil 12 from the water surface 14 towards the interior of the core 32. As will be described, the sheet strip 50 is wound and the stacked core layers 52a,52b,52c . . . 52x are preferably secured under a coiled tension selected to provide the core 32 with a semi-rigid structure laterally or horizontal direction, selected to maintain core integrity and resist core vertical deformation or deflection and/or the unspooling of the coiled sheet strip 50 during storage and deployment of the pad 20, and most preferably as the pad 20 is subjected to the forces of anticipated wave action.

FIGS. 2 and 3 illustrate best the outer cover 34 as being formed as a sleeve arrangement enveloping the laminar core 32. Most preferably, the cover 34 is formed by welding together top and bottom sheets 44,46 of fluid permissible spunbond non-woven fabric along the radial outer edge 26 of the flotation pad 20.

The top and bottom sheets 44,46 are most preferably substantially hydrophobic and are selected from fluid porous spunbond polypropylene sheets of 25 to 50 gsm which are selected to permit the substantially unhindered passage of water and contaminates 14 there through. The applicant has appreciated that providing both a core 32 made of coiled superabsorbent meltblown polypropylene sheet 50 and spunbond polypropylene top and bottom sheet layers 44,46, advantageously may facilitate the subsequent recycling, cleaning and possible repurposing of the flotation pad 20 after use and contaminate saturation.

FIGS. 2 and 3 illustrate best the flotation pad 20 as being formed with eight pairs of opposing radially extending heat welds 58a-58h. The pairs of radially extending heat welds 58a,58b,58c,58d,58e,58f,58g,58h are provided to respectively fuse both the top sheet 44 and bottom sheet 46 of the coiled fabric 50 of the laminar core 32. The heat welds 58a-58h are formed in vertically opposing positions in each of the upper and lower pad surfaces 22,24, and extend radially away from the through bore 28 and axis $A_1$-$A_1$ to the radial peripheral edge 36. Each of the pairs of heat welds 58a-58h preferably have a width of between about 0.3 and 2 inches and extend inwardly towards the core interior 32 a distance of between about 0.3 to 0.75 inches. The heat welds 58a-58h are configured to effect both the melt fusing of the top and bottom sheets 44,46 to the core 32, as well as lateral fusing of adjacent core sheet layers 52a,52b,52c . . . 52x to thereby fixing the coiled sheet 50 under wound tension. FIG. 4 shows best a heat weld 58d extending partially inward into edge portions of the coiled core layers 50 to form a fused melted polyester layer 60 which merges material from the top sheet 44 and the adjacent portions of the coiled layer sheets 50.

Figure 7:
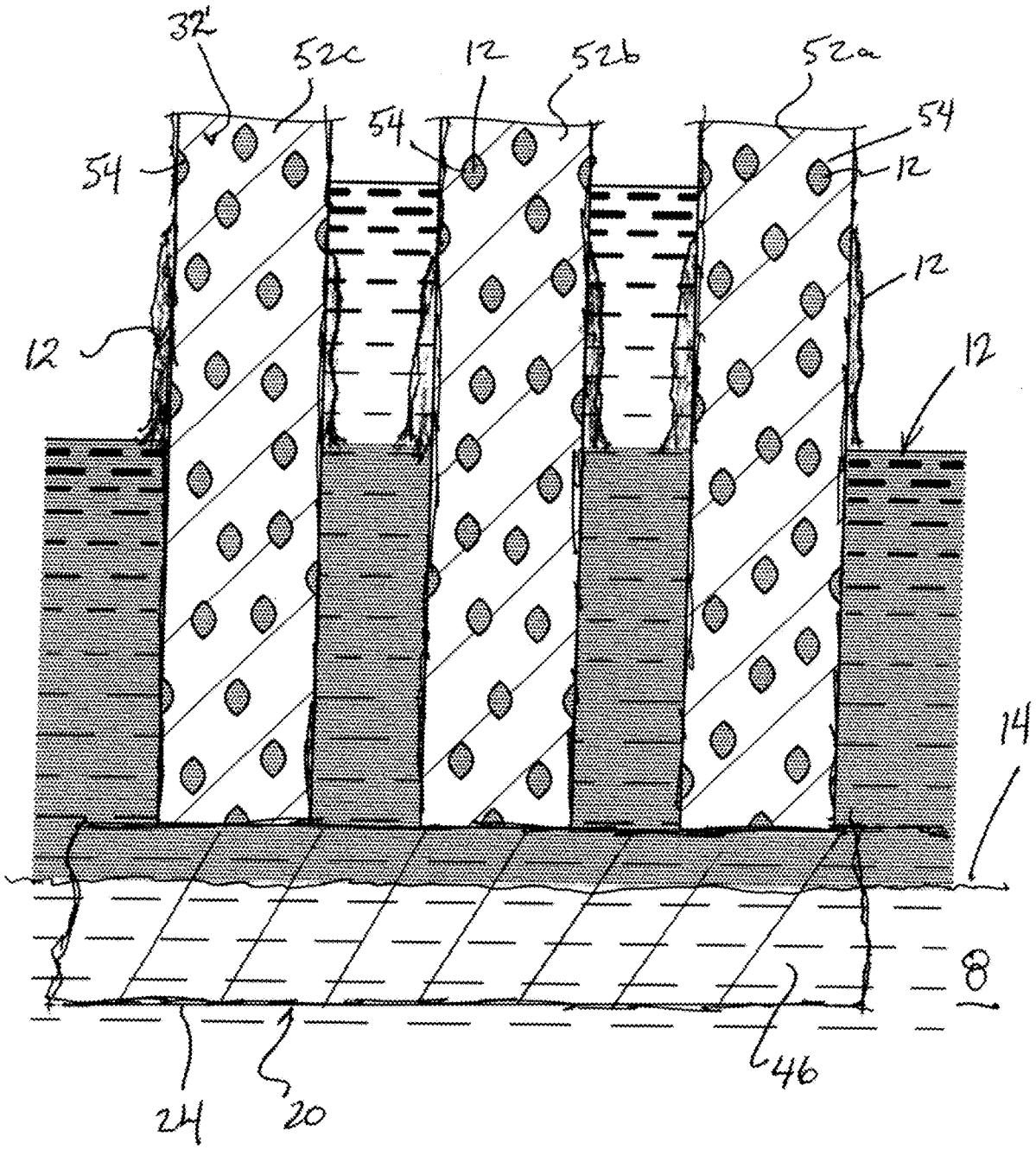
FIG. 7 illustrates an enlarged partial view showing schematically the absorption and adsorption of contaminants within the laminar core fabric layers, in the deployment of the containment boom shown in FIG. 1.

FIG. 7 illustrates an enlarged partial view of the flotation pad 20 in use in the collection and absorption/adsorption of contaminate oil 12. In use the flotation pad 20 is floated on the water surface 14 of the water body 8 and tethered to one or more adjacent flotation pads 20 using the tether assembly 36 in the manner shown in FIG. 1.

By reason of the partially hydrophobic nature of the superabsorbent microfiber polypropylene sheet strip 50, and the spacing Sp between the individual stacked core layers 52a,52b,52c . . . 52x, contaminant oil 12 dispersed on the water surface 14 is preferentially drawn both into the interspacing Sp between the juxtaposed core layers 52a,52b, 52c by wicking and capillary action and is further absorbed and adsorbed by the sheet 50 in the sheet porous structure 54, allowing the flotation pad 20 to be saturated preferentially with contaminant oil 12.

Following saturation, the tether assembly 36 may be used to facilitate the retrieval and extraction of the oil saturated flotation pad 20, allowing the removal of absorbed and adsorbed contaminant oil 12 therewith. Following retrieval, the removed contaminant oil 12 may be extracted from the saturated pad 20 by mechanical means, such as subjecting the pad 20 to centrifuge or by press rolling, allowing the pad 20 to be reused and/or any extracted oil to be recycled.

Figure 8:
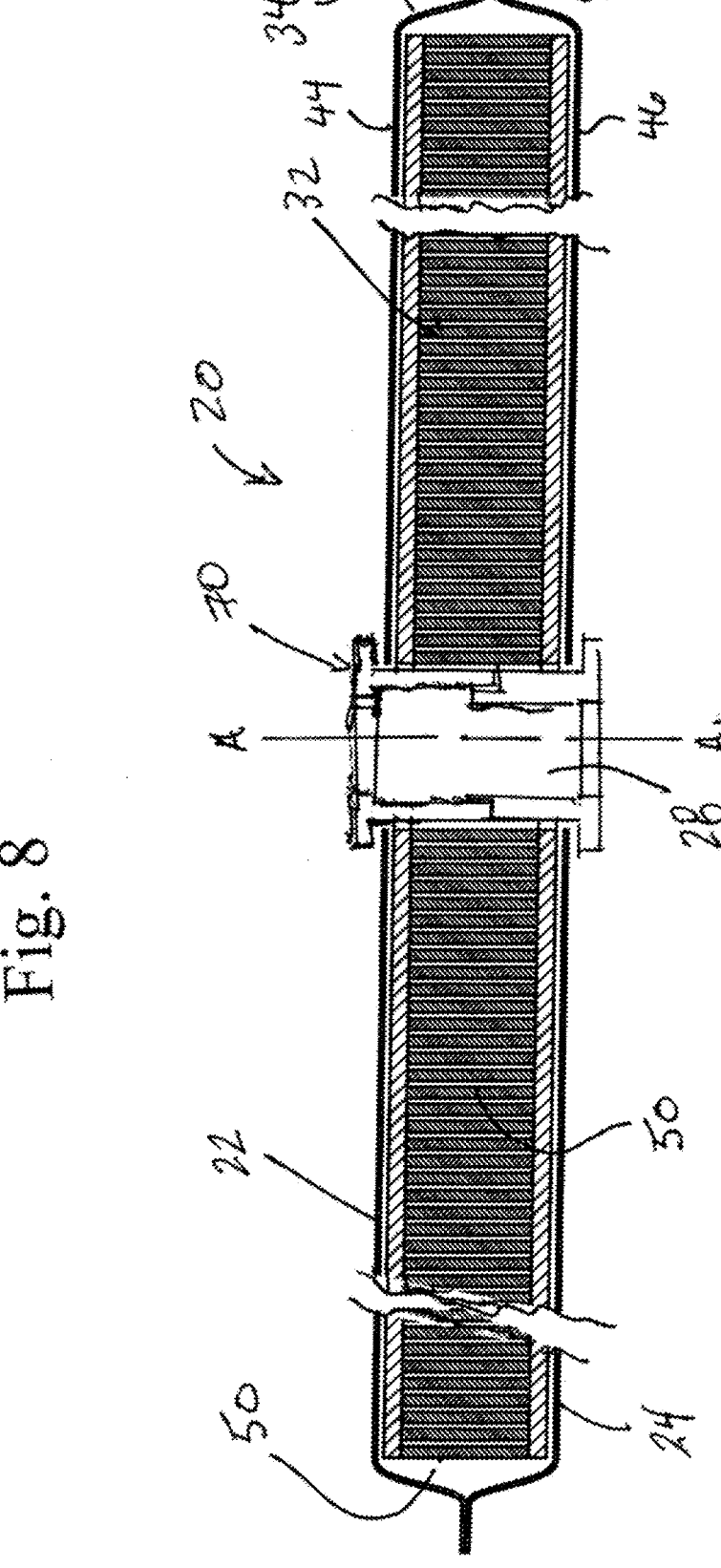
FIG. 8 illustrates a cross-sectional view of a sorptive flotation pad in view of FIG. 3 in accordance with a further embodiment of the invention.

Reference may be had to FIG. 8 which illustrates a cross-sectional view of a flotation pad 20 in accordance with an alternate embodiment of the invention, and wherein like reference numerals are used to identify like components. In FIG. 8, the flotation pad 20 is further provided with an axially disposed reinforcing grommet 70. The reinforcing grommet 70 is used to provide added internal reinforcement to the laminar core 32, and further minimize potential damage or degradation by the physical effects of wave action or tension forces applied by the tether assembly (not shown).

In a most simplified construction, the reinforcing grommet 70 is formed from polypropylene as a two piece grommet which is assembled as a press or friction fit construction. In another embodiment, the grommet 70 may be formed by separately coiling a non-woven sheet under a different winding tension and which secured the separately coiled plug axially within the outer coiled core. It is to be appreciated however that the reinforcing grommet may be made from a variety of different materials.

Figure 9:
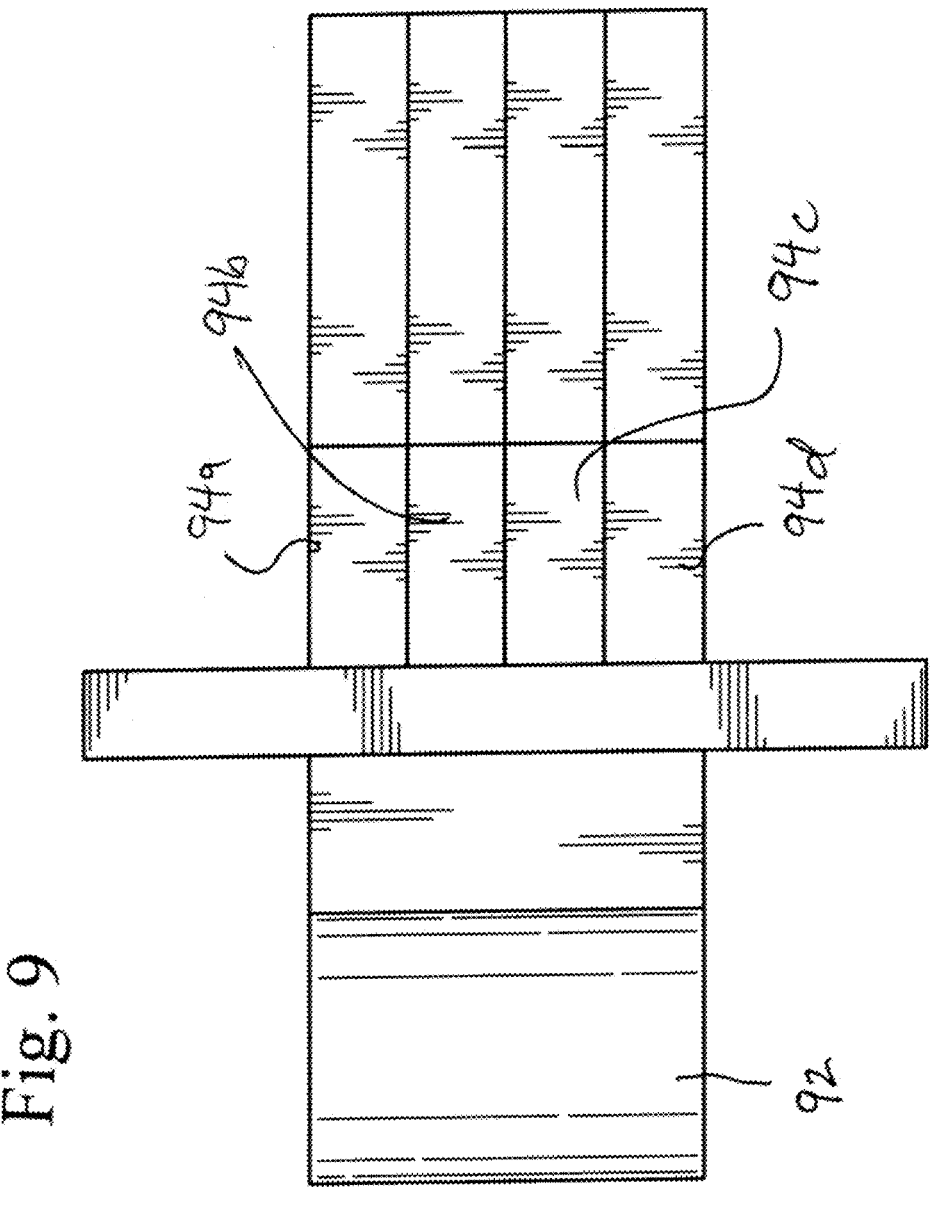
FIGS. 9 and 10 illustrate schematically an apparatus for the manufacture of the laminar core used in the manufacture of a sorptive flotation pad in accordance with a preferred embodiment of the invention.
Figure 10:
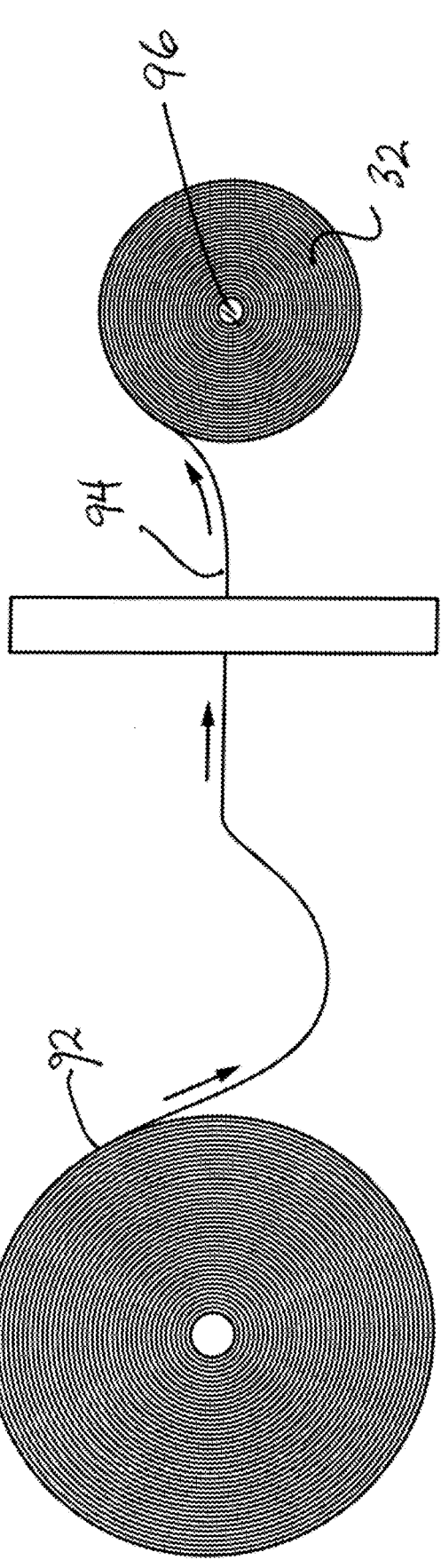
Figure 11:
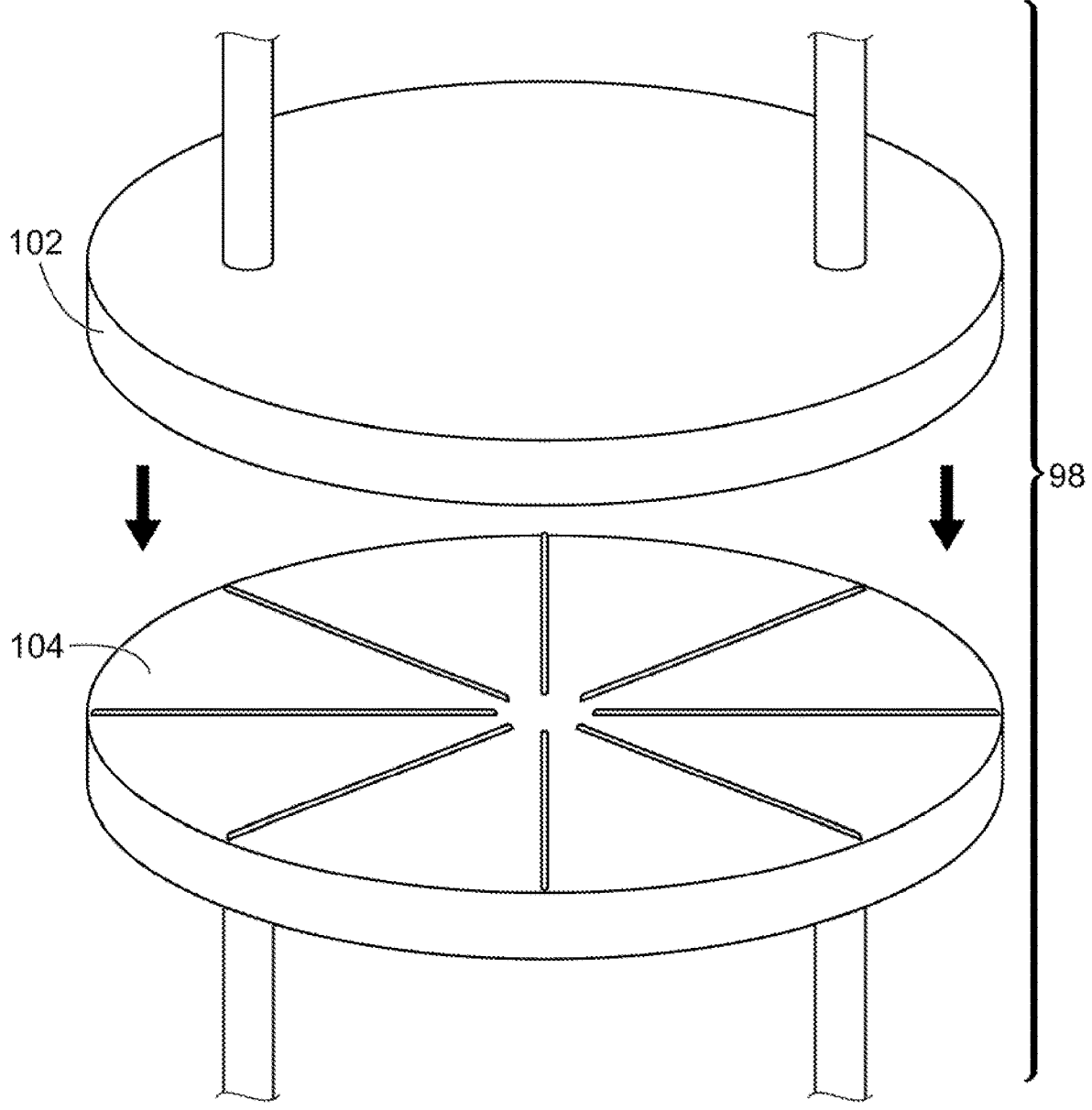
FIG. 11 illustrates schematically a platten used in the heat bonding of pad cover layers to the laminar core in the manufacture of a sorptive flotation pad in accordance with a preferred embodiment of the invention.

Reference may now be had to FIGS. 9 to 11 which illustrate schematically an apparatus used in the manufacture of a flotation pad 20 in accordance with the preferred embodiment.

As shown best in FIG. 9, initially the spirally wound laminar core 32 is formed by cutting a sheet 92 of super absorbent non-woven microfiber material into individual strips 94a,94b,94c,94d, each having the desired laminar core vertical thickness.

Following cutting, the strips 94a-94d are simultaneously wound on a rotary mandible 96 under the desired winding tension and cut to length to provide a laminar core 32 having the desired radial diameter and stacked layer 50a,50b, 50c . . . 50x spacing.

Whilst in a preferred embodiment, each laminar core 32 is formed by winding a single associate continuous strip 94, in an alternative configuration, a number of different windings with different axial apertures and diameters may be provided, and thereafter concentrically orientated and positioned.

Following the formation of the laminar core 32, separate top and bottom sheets 44,46 of spunbond polyester are positioned over the top and bottom of the wound core 32. A heat welding platten machine 98 having upper and lower plattens 102,104 adapted to form melt ribs is then used to press-form the paired heat welds 58*a*-58*h*, thermally welding the spunbond sheets 44,46 to the core 32. Following heat welding, the peripheral edges of the sheets 44,46 may be sonically welded along the periphery 26 of the flotation pad 20. Alternatively, edge welding of the sheets 44,46 may be effected by the plattens simultaneously by the plattens 102,104**.

Although the detailed description describes the use of the flotation pad 20 as forming part of an oil containment boom 10, the invention is not so limited. In an alternative construction, fewer or individual flotation pads 20 may be used for general water purification and the removal of contaminants. In one non-limiting embodiment, a single pad 20 may be used in a dock environment as a means of absorbing and/or adsorbing spilt motorboat fuels and oils. In other non-limiting embodiments, flotation pads 20 may be provided for use in swimming pools or hot tubs for the collection and removal of fats, esters, or oils originating from user sunscreens or skin care products.

Whilst the preferred embodiment of the invention describes the pad 20 as used to collect contaminants 12 which have been dispersed on the water surface 14 of a water body 8, in other applications, the pad 20 may be used in the collection and clean-up of contaminants which have been spilt on the ground or other hard surfaces. In such uses, the pad 20 may be positioned directly on top of the spill to assist in the absorption and/or leaching of contaminants from the floor or ground.

Where the pad 20 is used to clean contaminants which have not been disbursed on water surfaces 14, it is to be appreciated that the laminar core 32 may be less hydrophobic. In one further non-limiting embodiment, the top and bottom sheets 44,46 and/or the coiled polypropylene sheet strip 50 may be treated with surfactants or other chemicals to increase hydrophilic properties, and the overall absorptive capacity of the pad 20. In non-limiting embodiments, the polypropylene sheets strip 50 may be treated with NuWet 550™ as a hydrophilic silicon treatment finish. In alternative embodiments, VW451™ or VW351™ pellet additives may be added to the polypropylene sheet strip and/or the spunbond sheets 44,46 to increase absorptive capacities.

In another embodiment, the pad 20 may be used as a topper for placement between stacked 55 gallon oil drums to limit seepage and/or spills.

Although the detailed description describes the use of the flotation pads 20 in the absorption and adsorption of spilt oil 12, the invention is not so limited. It is to be appreciated that the flotation pads 20 may be used to trap and remove a variety of different types of contaminants from water, including different hydrocarbons such as diesel fuel and gasoline, as well as other types of fats, oils and other compounds dispersed on a fluid body surface 14.

Although the detailed description describes the tether assembly 36 as incorporating a rope 38 comprised of polypropylene, tether cables made from other materials are also envisioned. The tether cable material will vary depending on the tensile requirements of the marine environment of flotation pad 20 deployment, and/or an expected resulting weight of the pad 20 when saturated with contaminants.

Whilst the detailed description describes each individual flotation pad 20 as having an outer cover 34 made from spunbond fabric sheets 44,46 the invention is not so limited. It is to be appreciated that in other constructions, the cover 34 made be formed from other types of fabrics, including non-woven microfibers. Alternatively, either or both of the top and bottom sheets 44,46 may be omitted in its entirety, and/or replaced with screens or perforated panels made from plastic such as polypropylene or the like.

While the preferred embodiment illustrates the flotation pad 20 as including eight pairs of radially oriented heat welds 58*a*-58*h*, the invention is not so limited. It is to be appreciated that the flotation pad 20 could be formed with greater or fewer number of aligned or non-aligned welds, depending on the overall pad dimension, and/or intended site of usage. In addition, individual sheet layers 52*a*,52*b*, 52*c* . . . 52*x* and/or top and bottom sheets 44,46 may be thermally fused with differently oriented and/or non-paired thermal welds. In an alternative construction, the orientation of the coiled sheet layers 52*a*,52*b*,52*c* . . . 52*x* may be maintained using adhesives and/or other mechanical securement techniques.

Although the disclosure describes and illustrates various preferred embodiments, the invention is not so limited. Many modifications and variations will now occur to persons skilled in the art.

I claim:

1. An apparatus for the absorption and/or adsorption of contaminates, the apparatus comprising:

at least one generally tabular sorption body configured for positioning in contact with said contaminates, the sorption body having generally parallel upper and lower surfaces and having a laminar core comprising a plurality of polypropylene sheet layers provided in a side-by-side juxtaposed arrangement, the polypropylene sheet layers having a porosity structure selected to provide at least partial sorption of said contaminates thereby and defining a spacing therebetween selected to effect the capillary rise of said contaminates towards an interior of the laminar core therein, wherein the apparatus is at least partially buoyant and is adapted for the removal of said contaminates from a water body surface, the apparatus further comprising:

a first fluid porous cover member positioned over the upper surface, a second fluid porous cover member being positioned over the lower surfaces, wherein each of the first and second porous cover members, comprise polypropylene, and further comprising at least one respective heat weld thermally fusing a portion of each of the first and second cover members respectively to a respective upper and lower surface.

2. The apparatus of claim 1, wherein said laminar core comprises a non-woven microfiber polypropylene sheet which is spirally wound radially about a generally vertical axis, as said polypropylene sheet layers wherein spirally adjacent ones of said polypropylene sheet layers are secured under a winding tension, and whereby said laminar core has a rigidity selected to resist deformation when said apparatus is positioned on said water body surface.

3. The apparatus of claim 1, wherein the polypropylene sheet layers are provided as a spirally wound non-woven meltblown polypropylene sheet strip, said sheet strip being substantially hydrophobic, and said first and second cover members are substantially hydrophobic spunbond polypropylene fabric layers.

4. The apparatus of claim 1, wherein the polypropylene sheet layers are provided in a generally vertically oriented, laterally stacked side-by-side orientation as part of a substantially continuous, spiral wound 20 to 100 gsm meltblown non-woven polypropylene fabric sheet.

5. The apparatus of claim 1, wherein said sorption body comprises a generally disk-shaped pad having generally planar parallel spaced upper and lower surfaces and/or a radial diameter selected at between about 3 and 72 inches, or between about 8 and 26 inches, and/or a vertical thickness selected at between about 0.5 and 8 inches, or between about 1.5 and 6 inches.

6. The apparatus of claim 2, wherein the sorption body includes at least one through-bore extending generally vertically through an axial center of said spirally wound non-woven microfiber polypropylene sheet, the sorption body optionally including a reinforcing plug positioned at said axial center and defining said through-bore, and wherein the reinforcing plug comprises polyethylene or polypropylene.

7. An oil containment boom for the collection and/or containment of contaminant oil, wherein said containment boom comprises a plurality of the apparatus as claimed in claim 1 tethered together in a generally edge-to-edge orientation.

8. An apparatus for absorption and/or adsorption of contaminates from a surface of a water body, the apparatus comprising:

a buoyant sorption body configured for floatation on the water body, the sorption body including a laminar core comprising a spiral wound superabsorbent microfiber polypropylene sheet coiled about a generally vertical axis and defining a plurality of generally vertically oriented non-woven polypropylene sheet layers provided in a substantially side-by-side juxtaposed arrangement, the polypropylene sheet layers having a porosity structure selected to provide at least partial absorption of said contaminates thereby, and defining a lateral spacing therebetween selected to facilitate capillary movement of the core said contaminates from said water body towards an interior of the laminar core, and wherein said laminar core is a generally disk-shaped core having a vertical thickness of between about 0.5 and 8 inches, or between about 1 and 4 inches, and/or radial diameter selected at between about 3 and 72 inches, or between about 12 to 36 inches, at least one fixing member, physically securing at least some of said polypropylene sheet layers in a tension coiled position in said substantially side-by-side juxtaposed arrangement, wherein said at least one fixing member comprises a thermal weld physically melt fusing said at least some laterally adjacent ones of said polypropylene sheet layers.

9. The apparatus as claimed in claim 8, wherein said microfiber polypropylene sheet is a 20 to 100 gsm non-woven polypropylene fabric sheet having a density less than about 1 gm/cm³, and said microfiber polypropylene sheet being secured under a tension selected to substantially maintain said laminar core with lateral integrity selected to substantially withstand wind or wave action when said sorption body is floated on said water body.

10. The apparatus as claimed in claim 8, comprising at least four or at least eight of said fixing members, each said fixing member comprising an elongate thermal weld extending radially relative to said vertical axis and physically melt fusing said at least some laterally adjacent said polypropylene sheet layers.

11. The apparatus as claimed in claim 10, wherein said laminar core is interposed between a top cover member and a bottom cover member, each of the cover members having a fluid porosity selected to permit the substantially unhindered movement of water and contaminants therethrough.

12. The apparatus as claimed in claim 11, wherein at least one of the cover members comprises a spunbond polypropylene fabric sheets of 25 to 60 gsm, and wherein each spunbond polypropylene sheet is at least partially melt fused to at least some of said polypropylene sheet layers by at least one said fixing member.

13. A contaminate removal apparatus for use absorbing contaminants from a water body surface, the waterbody surface being selected from the group consisting of an ocean body, a lake body, a swimming pool, and a hot tub, the apparatus comprising:

a sorption body comprising a substantially hydrophobic coiled microfiber material strip, said strip being wound about a generally vertical axis, said body having spaced generally planar top and bottom portions, and a generally circumferential side portion connecting the top portion and the bottom portion, a top sheet of microfiber material overlaying the top portion, a bottom sheet of microfiber material overlaying the bottom portion, wherein an edge portion of the top sheet and bottom sheet are welded together to at least partially envelope the sorption body, and at least one associated rib heat welded into at least one of the top sheet and the bottom sheet, each rib at least partially melt fusing the sheet and adjacent portions of the microfiber material strip.

14. The apparatus of claim 13, wherein the microfiber material strip is a 20 to 100 gsm meltblown non-woven polypropylene strip, said strip being wound about said vertical axis and defining a plurality of vertically oriented juxtaposed sheet layers, stacked laterally as a side-by-side array, the polypropylene strip being secured under a coiled tension selected to assist in maintaining at least partial lateral integrity of said sorption body when positioned on said water body surface.

15. The apparatus of claim 14, wherein the sorption body includes an axially oriented through-bore, said apparatus further comprising a tether assembly received at least partially in the through-bore to facilitate positioning and/or retrieval of the apparatus from the water body surface, the tether assembly comprising a polypropylene cable.

16. The apparatus of claim 14, wherein at least one of the top sheet and the bottom sheet is a fluid permeable, spunbond polypropylene sheet, or is a 25 to 50 gsm hydrophobic polypropylene sheet.

17. The absorption apparatus as claimed in claim 13, comprising a plurality of pairs of said ribs, said pairs of ribs being opposedly formed in portions of said respective top and bottom cover sheets, and being generally elongated in an orientation extending radially from said vertical axis.

* * * * *